United States Patent
Kim et al.

(10) Patent No.: US 11,514,645 B2
(45) Date of Patent: Nov. 29, 2022

(54) ELECTRONIC DEVICE FOR PROVIDING VISUAL LOCALIZATION BASED ON OUTDOOR THREE-DIMENSION MAP INFORMATION AND OPERATING METHOD THEREOF

(71) Applicants: NAVER CORPORATION, Gyeonggi-do (KR); NAVER LABS CORPORATION, Seongnam-si (KR)

(72) Inventors: Deokhwa Kim, Seongnam-si (KR); Donghwan Lee, Seongnam-si (KR)

(73) Assignees: NAVER CORPORATION, Gyeonggi-do (KR); NAVER LABS CORPORATION, Gyeonggi-do (KR)

( * ) Notice: Subject to any disclaimer, the term of this patent is extended or adjusted under 35 U.S.C. 154(b) by 124 days.

(21) Appl. No.: 17/166,489

(22) Filed: Feb. 3, 2021

(65) Prior Publication Data
US 2021/0241523 A1 Aug. 5, 2021

(30) Foreign Application Priority Data
Feb. 4, 2020 (KR) .................. 10-2020-0012972

(51) Int. Cl.
*G06T 17/05* (2011.01)
*G06T 17/20* (2006.01)
(Continued)

(52) U.S. Cl.
CPC .............. *G06T 17/05* (2013.01); *G06T 17/20* (2013.01); *G06V 20/182* (2022.01); *G06V 20/38* (2022.01)

(58) Field of Classification Search
CPC . G06T 17/05; G06T 17/20; G06T 7/11; G06T 7/70; G06V 20/182; G06V 20/38; G06V 10/764; G06V 10/84; G06K 9/6296
See application file for complete search history.

(56) References Cited

U.S. PATENT DOCUMENTS

2005/0234638 A1* 10/2005 Ogaki ..................... G06T 17/05
340/995.19
2007/0070069 A1* 3/2007 Samarasekera ......... G06F 3/011
707/E17.013
(Continued)

FOREIGN PATENT DOCUMENTS

JP       2012-043185 A    3/2012
JP       2019-27799 A     2/2019

OTHER PUBLICATIONS

Agrawal, Motilal, Kurt Konolige, and Robert C. Bolles. "Localization and mapping for autonomous navigation in outdoor terrains: A stereo vision approach." 2007 IEEE Workshop on Applications of Computer Vision (WACV'07). IEEE, 2007. (Year: 2007).*
(Continued)

*Primary Examiner* — Maurice L. McDowell, Jr.
(74) *Attorney, Agent, or Firm* — Harness, Dickey & Pierce, P.L.C.

(57) ABSTRACT

Electronic devices and/or operating methods of the electronic device to provide visual localization based on outdoor three-dimensional (3D) map information may be provided. Such electronic devices may be configured to acquire two-dimensional (2D) image information about an outdoor environment, generate 3D map information about the outdoor environment based on the 2D image information, and determine a position of a point in the 3D map information corresponding to a query image.

17 Claims, 9 Drawing Sheets

(51) Int. Cl.
   *G06V 20/00*      (2022.01)
   *G06V 20/10*      (2022.01)

(56)         References Cited

U.S. PATENT DOCUMENTS

2010/0201682  A1*  8/2010  Quan ...................... G06T 15/04
                                                          382/173
2014/0010407  A1*  1/2014  Sinha ..................... G06V 20/10
                                                          382/103
2021/0148722  A1*  5/2021  Ko ..................... G01C 21/3638

OTHER PUBLICATIONS

Wolcott, Ryan W., and Ryan M. Eustice. "Visual localization within lidar maps for automated urban driving." 2014 IEEE/RSJ International Conference on Intelligent Robots and Systems. IEEE, 2014. (Year: 2014).*
Korean Office Action dated Mar. 24, 2021 issued in the corresponding Korean Patent Application No. 10-2020-0012972.

* cited by examiner

ELECTRONIC DEVICE FOR PROVIDING VISUAL LOCALIZATION BASED ON OUTDOOR THREE-DIMENSION MAP INFORMATION AND OPERATING METHOD THEREOF

CROSS-REFERENCE TO RELATED APPLICATION(S)

This U.S. non-provisional application claims the benefit of priority under 35 U.S.C. § 119 to Korean Patent Application No. 10-2020-0012972, filed Feb. 4, 2020, the entire contents of which are incorporated herein by reference in their entirety.

BACKGROUND

Technical Field

One or more example embodiments relate to electronic devices for providing visual localization based on outdoor three-dimensional (3D) map information and/or operating methods of the electronic device.

Related Art

In general, visual localization is proposed to provide navigation in an indoor environment. The visual localization (or alternatively referred to as "localization") refers to determining a location of a query image in a surrounding environment (e.g., to determine location of a query image in visual images of the surrounding environment). For example, a robot may perform the visual localization using map information about the indoor environment and may move indoors accordingly. Currently, research to expand the visual localization to an outdoor environment is ongoing. For the visual localization in the outdoor environment, three-dimensional (3D) map information about the outdoor environment is used. However, because the outdoor environment is very spacious, it is difficult to generate the 3D map information about the outdoor environment. That is, relatively large throughput (e.g., a relatively large amount of data to be processed) and/or a relatively long processing time are used to generate the 3D map information about the outdoor environment.

SUMMARY

At least one example embodiment provides an electronic device for providing visual localization in an outdoor environment based on three-dimensional (3D) map information about the outdoor environment and an operating method of the electronic device.

At least one example embodiment provides an electronic device that may reduce a throughput (e.g., a relatively large amount of data to be processed) and a processing time used to generate 3D map information about an outdoor environment and an operating method of the electronic device.

According to at least one example embodiment, there is provided an electronic device for providing visual localization based on outdoor 3D map information and an operating method of the electronic device.

According to an aspect of at least one example embodiment, an operating method of an electronic device includes acquiring, using a processor included in the electronic device, two-dimensional (2D) image information about an outdoor environment, generating, using the processor, 3D map information about the outdoor environment based on the 2D image information, and determining, using the processor, a position of a point in the 3D map information corresponding to a query image.

According to an aspect of at least one example embodiment, an electronic device includes a memory and a processor configured to connect to the memory and to execute at least one instruction stored in the memory. The processor is further configured to acquire 2D image information about an outdoor environment, generate 3D map information about the outdoor environment based on the 2D image information, and determine a position of a point in the 3D map information corresponding to a query image.

According to an aspect of at least one example embodiment, there is provided a non-transitory computer-readable record medium storing instructions that, when executed by a processor, cause a computer to implement a visual localization providing method. The visual localization providing method includes acquiring, using the processor, 2D image information about an outdoor environment, generating, using the processor, 3D map information about the outdoor environment based on the 2D image information, and determining, using the processor, a position of a point in the 3D map information corresponding to a query image.

According to some example embodiments, an electronic device may generate 3D map information about an outdoor environment and may provide visual localization in the outdoor environment. That is, the electronic device may perform localization in the outdoor environment based on an analysis of the 3D map information about the outdoor environment. Here, the electronic device may segment the outdoor environment into a plurality of areas and may generate 3D map information for each of the areas, which may lead to reducing a throughput and a processing time used to generate the 3D map information about the outdoor environment. In addition, the electronic device may generate the 3D map information for each of the areas by considering pose information about adjacent areas, which may lead to reduction or minimization of distortion in a boundary between the areas.

Further areas of applicability will become apparent from the description provided herein. The description and specific examples in this summary are intended for purposes of illustration only and are not intended to limit the scope of the present disclosure.

DETAILED DESCRIPTION

One or more example embodiments will be described in detail with reference to the accompanying drawings.

Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and generate data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

At least one example embodiment provides an electronic device for providing visual localization based on outdoor three-dimensional (3D) map information and an operating method of the electronic device. According to at least one example embodiment, an electronic device may generate 3D map information about an outdoor environment and may provide visual localization in the outdoor environment. That is, the electronic device may perform localization in the outdoor environment based on the 3D map information about the outdoor environment. Here, the electronic device may segment the outdoor environment into a plurality of areas and may generate 3D map information for each of the areas. Through this, it is possible to reduce a throughput (e.g., a relatively large amount of data to be processed) and a processing time used for the electronic device to generate the 3D map information about the outdoor environment. In addition, the electronic device may generate the 3D map information for each of the areas by considering pose information about adjacent areas. Accordingly, distortion may be minimized at a boundary between areas in the 3D map information about the outdoor environment.

Figure 1:
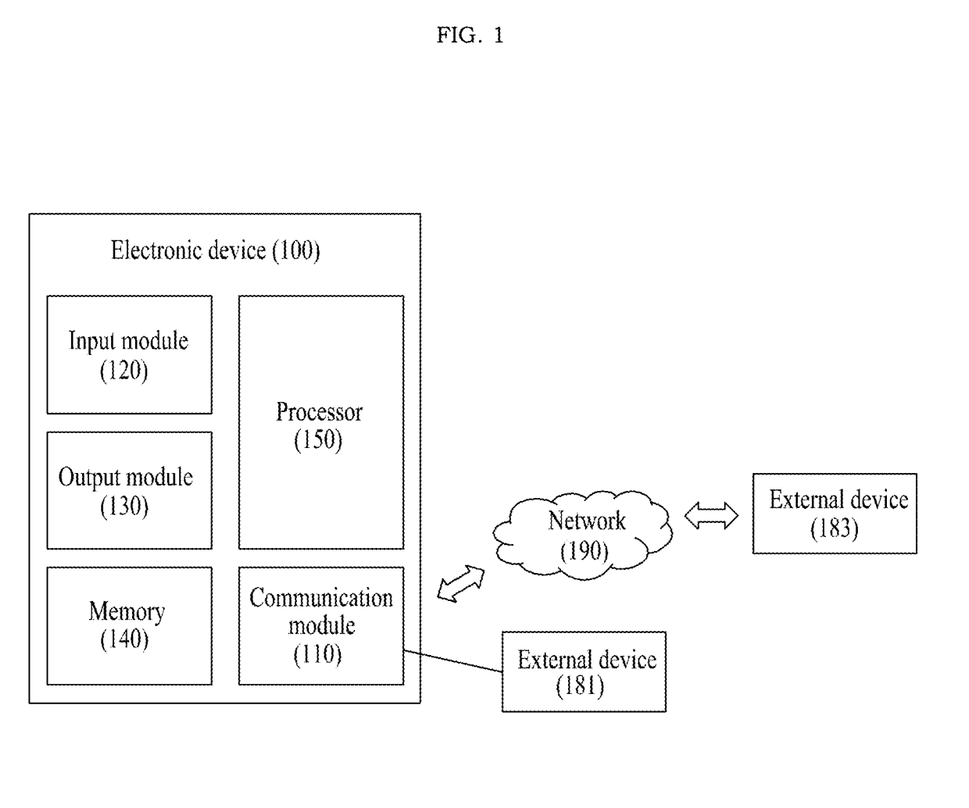
FIG. 1 is a diagram illustrating an example of an electronic device according to at least one example embodiment.
Figure 2A:
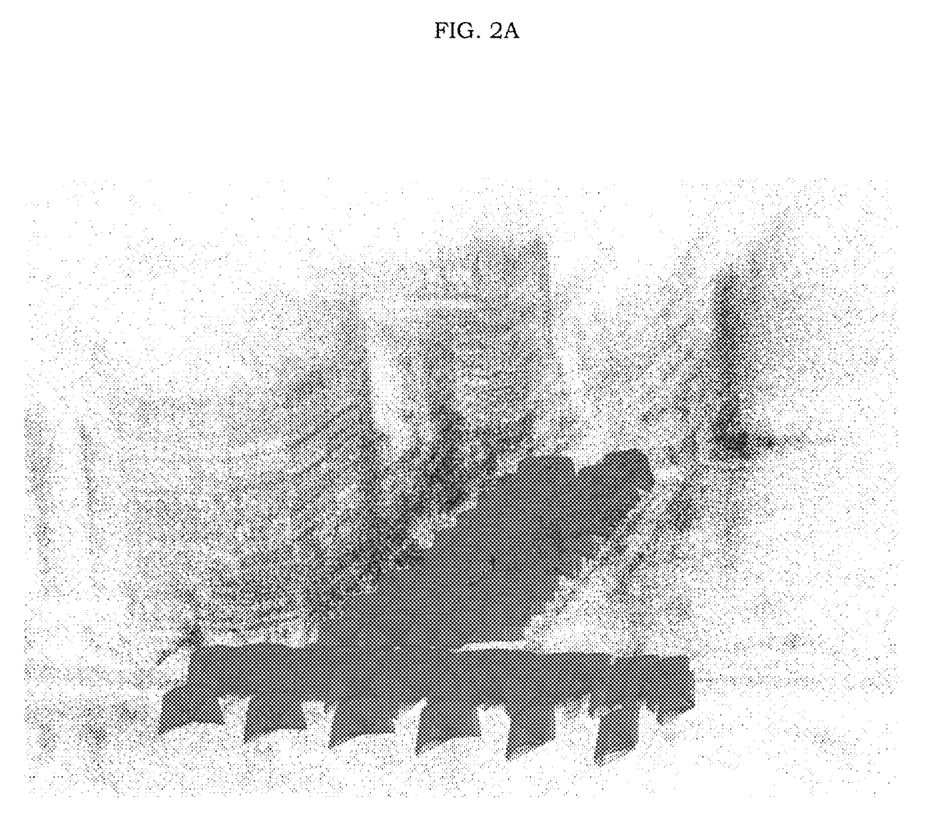
FIGS. 2A and 2B illustrate examples of three-dimensional (3D) map information generated by an electronic device according to at least one example embodiment.
Figure 2B:
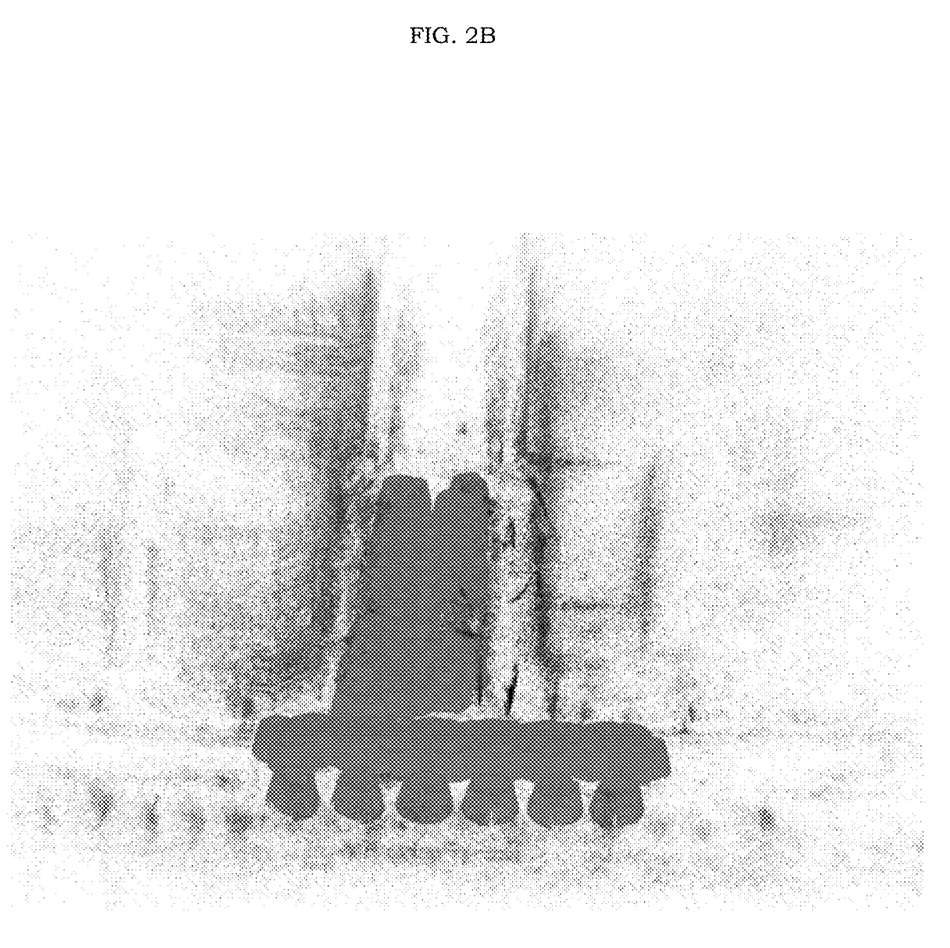

FIG. 1 is a diagram illustrating an electronic device 100 according to at least one example embodiment. FIGS. 2A and 2B illustrate examples of 3D map information generated by the electronic device 100 according to at least one example embodiment.

Referring to FIG. 1, the electronic device 100 according to at least one example embodiment may include at least one of a communication module 110, an input module 120, an output module 130, a memory 140, and a processor 150. Depending on example embodiments, at least one component may be omitted from among the components of the electronic device 100 and at least one another component may be added thereto. Depending on example embodiments, at least two of the components of the electronic device 100 may be configured into a single integrated circuit. Here, the electronic device 100 may include at least one of a server and an electronic apparatus. For example, the electronic apparatus may include at least one of a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and a robot.

The communication module 110 enables the electronic device 100 to communicate with an external device 181, 183. The communication module 110 may allow the electronic device 100 to establish a communication channel with the external device 181, 183 and to communicate with the external device 181, 183 through the communication channel. Here, the external device 181, 183 may include at least one of a satellite, a server, and an electronic apparatus. For example, the electronic apparatus may include at least one of a smartphone, a mobile phone, a navigation device, a computer, a laptop computer, a digital broadcasting terminal, a PDA, a PMP, a tablet PC, a game console, a wearable device, an IoT device, a VR device, an AR device, and a robot. The communication module 110 may include at least one of a wired communication module and a wireless communication module. The wired communication module may be connected to the external device 181 in a wired manner and may communicate with the external device 181 in the wired manner. The wireless communication module may include at least one of a near field communication module and a far field communication module. The near field communication module may communicate with the external device 181 using a near field communication method. For example, the near field communication method may include at least one of Bluetooth, wireless fidelity (WiFi) direct, and infrared data association (IrDA). The far field communication module may communicate with the external device 183 using a far field communication method. Here, the far field communication module may communicate with the external device 183 over a network 190. For example, the network 190 may include at least one of a cellular network, the Internet, and a computer network such as a local area network (LAN) and a wide area network (WAN).

The input module 120 may input a signal to be used for at least one component of the electronic device 100. The input module 120 may include at least one of an input device configured for a user to directly input an instruction or a signal to the electronic device 100 and a sensor device configured to detect an ambient environment and to generate a signal. For example, the input device may include at least one of a microphone, a mouse, and a keyboard. Depending on example embodiments, the sensor device may include at least one of a touch circuitry configured to detect a touch and a sensor circuitry configured to measure strength of force occurring due to the touch.

The output module 130 may output information to an outside of the electronic device 100. The output module 130 may include at least one of a display device configured to visually output information and an audio output device configured to output information as an audio signal. For example, the display device may include at least one of a display, a hologram device, and a projector. For example, the display device may be configured as a touchscreen through assembly to at least one of the sensor circuitry and the touch circuitry of the input module 120. For example, the audio output device may include at least one of a speaker and a receiver.

The memory 140 may store a variety of data used by at least one component of the electronic device 100. For example, the memory 140 may include at least one of a volatile memory and a non-volatile memory. Data may include at least one program and input data or output data related thereto. The program may be stored in the memory 140 as software including at least one instruction and may include at least one of an OS, middleware, and an application.

The processor 150 may control at least one component of the electronic device 100 by executing the program of the memory 140. Through this, the processor 150 may perform data processing or operation. Here, the processor 150 may execute an instruction stored in the memory 140.

According to at least one example embodiment, the processor 150 may provide visual localization based on outdoor 3D map information. That is, the processor 150 may perform localization in an outdoor environment based on the outdoor 3D map information. To this end, 3D map information about the outdoor environment may be used. That is, the processor 150 may store the 3D map information in the memory 140 and may perform the localization based on the 3D map information if desired.

The processor 150 may generate 3D map information based on 2D image information about the outdoor environment. For example, the outdoor environment may be defined as a specific area. The processor 150 may acquire 2D image information through scanning of the outdoor environment. Here, the 2D image information may include a plurality of street view images and pose information about each of the street view images. Here, the pose information may include a position, for example, a global positioning system (GPS) position and a pose, for example, three-axial position values and three-axial orientation values. For example, the processor 150 may store in advance the 2D image information in the memory 140 and, if desired, may acquire the 2D image information from the memory 140. The processor 150 may generate the 3D map information based on the 2D image information using a structure-from-motion (SfM) algorithm.

The processor 150 may segment the outdoor environment into a plurality of areas and may generate 3D map information based on 2D image information for each of the areas. Here, the processor 150 may arrange the areas based on a predetermined (or, alternatively, desired) size and shape (e.g., a polygonal shape, a rectangular shape, or a hexagonal shape). For example, the areas may be arranged in a grid form. Through this, the processor 150 may generate the 3D map information based on the street view images and pose information about each of the street view images, for each of the areas. Here, the processor 150 may generate the 3D map information using the SfM algorithm for each of the areas. For example, 3D map information about one of the areas may be generated as shown in FIG. 2A or 2B. Here, a pose and a 3D point of the 3D map information for each of the areas may be determined based on pose information about each of the street view images.

A high throughput (e.g., a large amount of data to be processed) and a long processing time may be used for the processor 150 to generate 3D map information about the overall outdoor environment at a time using the SfT algorithm because the outdoor environment is very spacious and an amount of 2D image information is very large accordingly. Therefore, the processor 150 may segment the outdoor environment into the plurality of areas and may generate 3D map information about each of the areas. In this manner, the throughput (e.g., an amount of data to be processed) and the processing time used by the processor 150 may decrease. Here, in the case of combining the 3D map information about each of the areas as 3D map information about the overall outdoor environment, distortion may occur at a boundary between the areas since each of the areas has different pose information. To mitigate or prevent the above issue, the processor 150 may additionally consider pose information about an adjacent another area to generate the 3D map information about each of the areas. Through this, in the case of combining the 3D map information about each of the areas as the 3D map information about the overall outdoor environment, the distortion in the boundary between the areas may be reduced or minimized.

Figure 3:
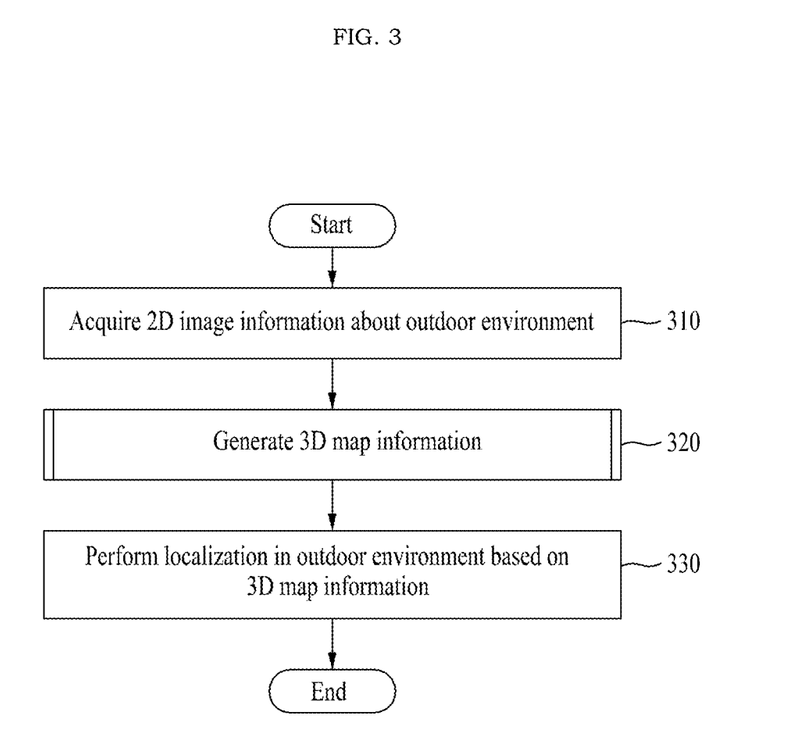
FIG. 3 is a flowchart illustrating an example of an operating method of an electronic device according to at least one example embodiment.

FIG. 3 is a flowchart illustrating an example of an operating method of the electronic device 100 according to at least one example embodiment.

Referring to FIG. 3, in operation 310, the electronic device 100 may acquire 2D image information about an outdoor environment. The processor 150 may acquire the 2D image information through scanning of the outdoor environment. Here, the 2D image information may include a plurality of street view images and pose information about each of the street view images. Here, the pose information may include a position, for example, a GPS position and a pose, for example, three-axial position values and three-axial orientation values. For example, the processor 150 may store in advance the 2D image information in the memory 140. The processor 150 may acquire the 2D image information from the memory 140.

In operation 320, the electronic device 100 may generate 3D map information about the outdoor environment based on the 2D image information. The processor 150 may generate the 3D map information based on the 2D image information. The processor 150 may generate the 3D map information based on the 2D image information using the SfM algorithm. Further description related thereto is made with reference to FIGS. 4, 5, 6, and 7.

Figure 4:
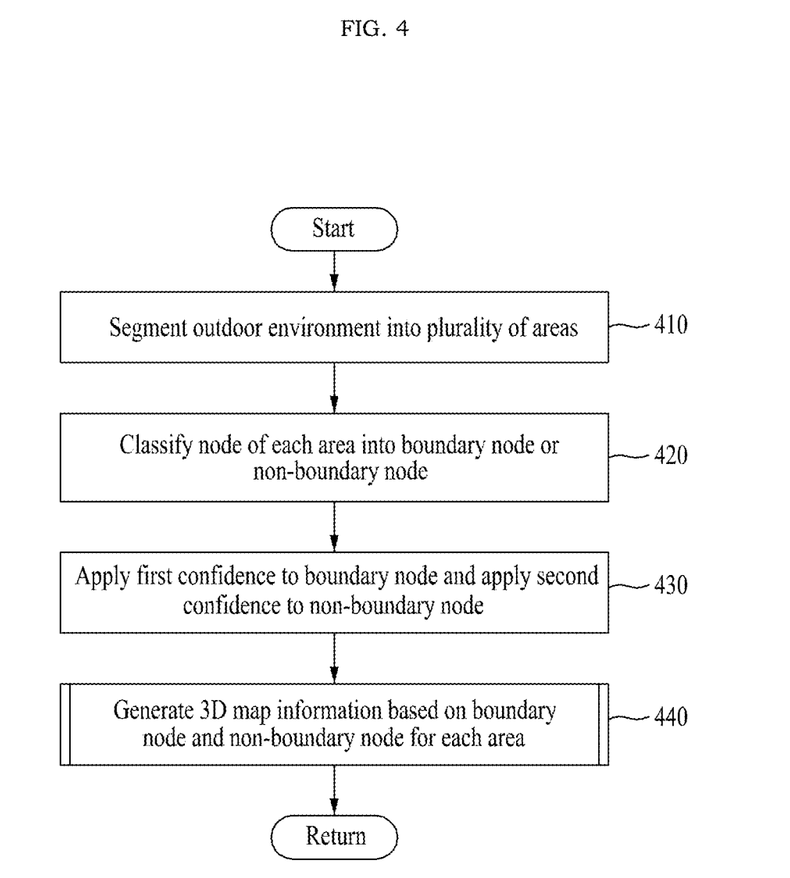
FIG. 4 is a flowchart illustrating a 3D map information generation operation of FIG. 3 according to at least one example embodiment.
Figure 5:
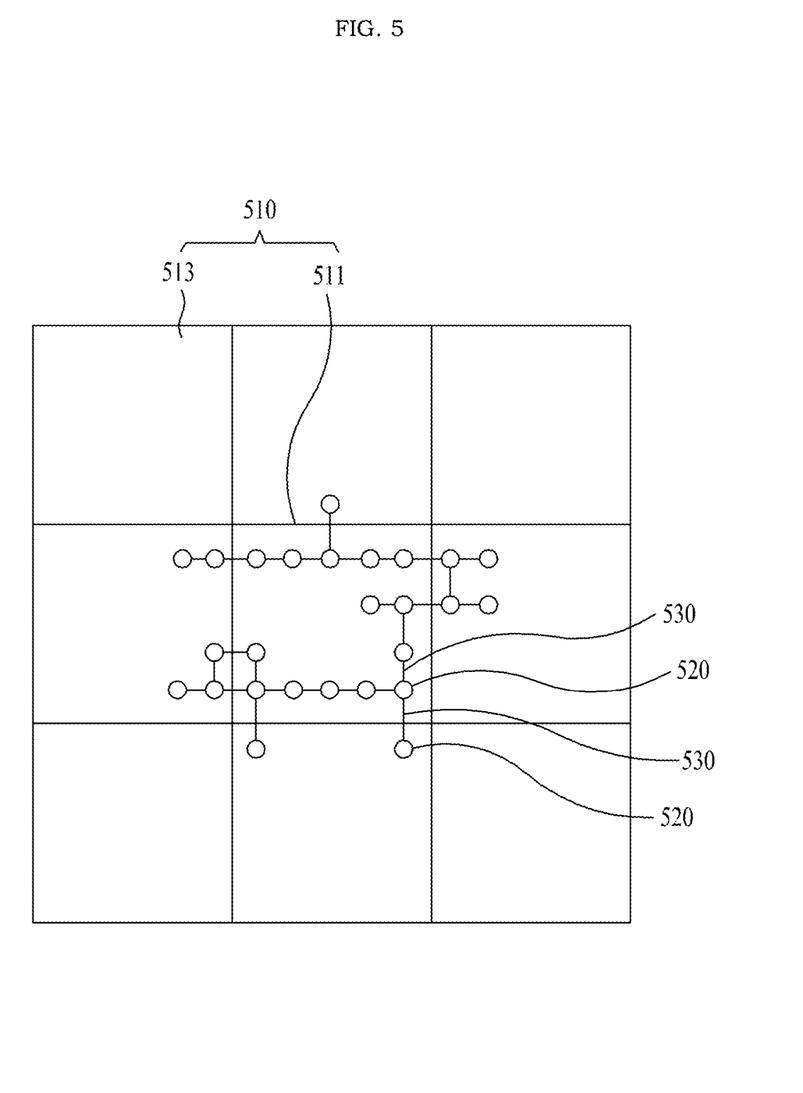
FIGS. 5, 6, and 7 illustrate examples of describing the 3D map information generation operation of FIG. 3 according to at least one example embodiment.
Figure 6:
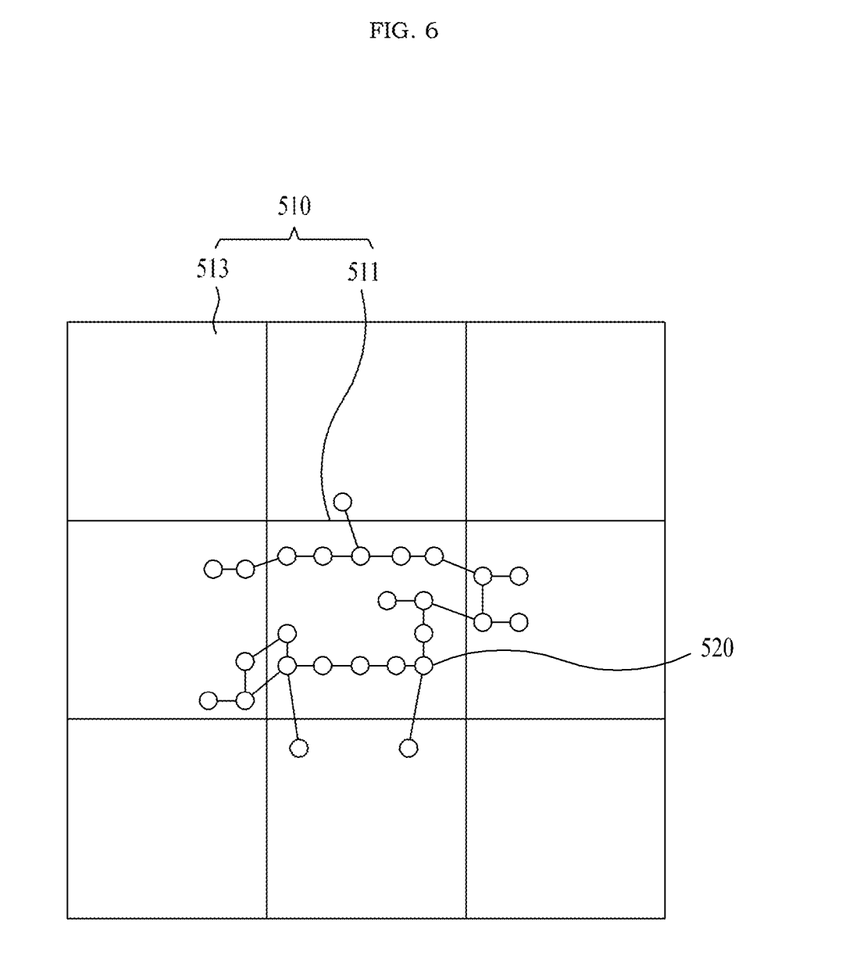
Figure 7:
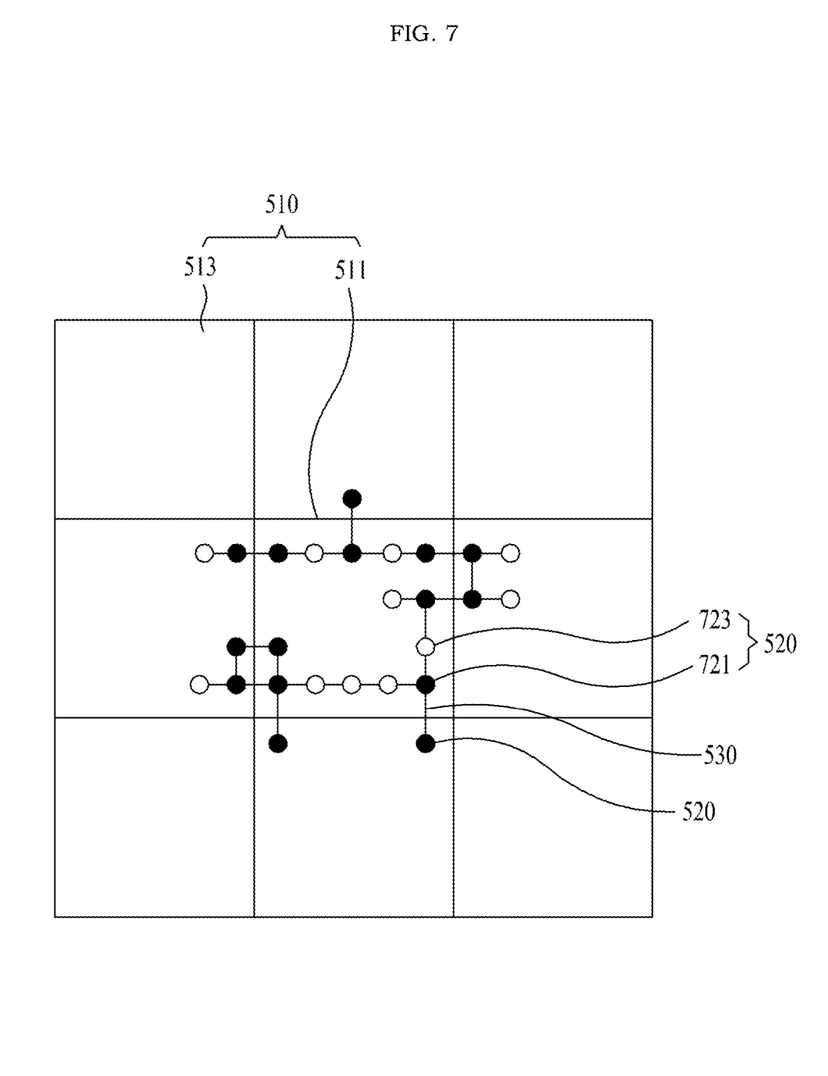

FIG. 4 is a flowchart illustrating a 3D map information generation operation 320 of FIG. 3 according to at least one example embodiment, and FIGS. 5, 6, and 7 illustrate examples of describing the 3D map information generation operation of FIG. 3 according to at least one example embodiment.

Referring to FIG. 4, in operation 410, the electronic device 100 may segment an outdoor environment into a plurality of areas 510. The processor 150 may segment the outdoor environment into the areas 510 each in a predetermined (or, alternatively, desired) size and shape. The shape of the area 510 may be determined as a polygonal shape (e.g., a rectangular shape or a hexagonal shape). For example, the areas 510 may be arranged in a grid form. Through this, a first area 511 and a plurality of second areas 513 may be determined for the respective areas 510. That is, each of the areas 510 may be determined as the first area 511 and the second areas 513 adjacent to the first area 511 may be determined based on the first area 511. For example, referring to FIG. 5, each of the areas 510 may be provided in a rectangular shape and the areas 510 may be arranged in a grid form. In this case, the first area 511 and eight second areas 513 for the first area 511 may be determined from the areas 510.

In operation 420, the electronic device 100 may classify each node 520 of each area 510 into a boundary node 721 or a non-boundary node 723. In each of the areas 510, the processor 150 may detect at least one node 520. The processor 150 may detect the node 520 in each of the areas 510 based on 2D image information. Here, the processor 150 may detect street view images for each of the areas 510 and may detect the node 520 based on pose information about each of the street view images. Through this, the processor 150 may detect the node 520 and may also detect a pose of the node 520. For example, referring to FIG. 5, a plurality of nodes 520 may be distributed in a graph form in the first area 511 and the second areas 513 and may be connected through a plurality of edges 530. Each edge 530 may connect the nodes 520 in the first area 511 and may connect the node 520 of the first area 511 and the node 520 of the second area 513. The processor 150 may classify each node 520 into the boundary node 721 or the non-boundary node 723 with respect to the first area 511. If the node 520 of the first area 511 is present within a preset (or alternatively, desired) distance from the node 520 of the second area 513, the processor 150 may classify the node 520 of the first area 511 into the boundary node 721. Based thereon, the processor 150 may classify the node 520 of the second area 513 corresponding thereto into the boundary node 721 of the second area 513. Meanwhile, unless the node 520 of the first area 511 is present within the preset (or alternatively, desired) distance from the node 520 of the second area 513, the processor 150 may classify the node 520 of the first area 511 into the non-boundary node 723. For example, referring to FIG. 7, the nodes 520 of the first area 511 may be classified into boundary nodes 721 and non-boundary nodes 723.

In operation 430, the electronic device 100 may apply a different confidence to each of the boundary node 721 and the non-boundary node 723. The processor 150 may apply a first confidence to the boundary node 721 and may apply a second confidence to the non-boundary node 723. Here, the second confidence may be less than the first confidence. According to at least one example, the processor 150 may assign a different weight to each of the boundary node 721 and the non-boundary node 723. The processor 150 may apply a first weight corresponding to the first confidence to the boundary node 721 and may apply a second weight corresponding to the second confidence to the non-boundary node 723. Here, the confidence or the weight may be associated with a correlation between the node 520 of the first area 511 and the node 520 of the second area 513. That is, because the boundary node 721 of the first area 511 is adjacent to the boundary node 721 of the second area 513, the correlation may be high and the confidence or the weight may be relatively high accordingly.

In operation 440, the electronic device 100 may generate the 3D map information based on the node 520 for each area 510. The processor 150 may generate the 3D map information about each area 510 using the SfM algorithm. The processor 150 may generate the 3D map information based on the confidence of each node 520 for each area 510. Here, the processor 150 may generate the 3D map information based on the first confidence for the boundary node 721 and the second confidence for the non-boundary node 723. For example, the processor 150 may estimate pose information about each node 520 based on the confidence of each node 520. Here, the processor 150 may detect an error of each edge 530 based on pose information of the node 520 in each area 510. The processor 150 may estimate the pose information of the node 520 based on the error of the edge 530 and the confidence of the node 520. Therefore, the processor 150 may generate the 3D map information based on pose information about each node 520. Here, a graph structure of the nodes 520 may be improved or optimized based on the pose information about each node 520. Through this, improved or optimized 3D map information about the outdoor environment may be acquired. Further description related thereto is made with reference to FIG. 8.

According to at least one example embodiment, in the case of combining 3D map information about each of the areas 510 as 3D map information about the overall outdoor environment, distortion may be reduced or minimized at a boundary between the areas 510. For example, in the case of generating 3D map information by applying the same confidence to all of the nodes 520 distributed in the graph structure in the first area 511 and the second areas 513 as illustrated in FIG. 5, distortion may occur at the boundary between the first area 511 and the second areas 513 as illustrated in FIG. 6 because pose information for each of the areas 510 is different. Accordingly, mismatching may occur between the 3D map information about the first area 511 and the 3D map information about at least one of the second areas 513. In contrast, in the case of generating 3D map information by applying a different confidence to each of the boundary nodes 721 and the non-boundary node 723 distributed in the graph structure in the first area 511 and the second areas 513 as illustrated in FIG. 5, the distortion may be reduced or minimized at the boundary between the first area 511 and the second areas 513 as illustrated in FIG. 7 because pose information about the boundary node 721 of the first area 511 is estimated based on pose information of the boundary node 721 in at least one of the second areas 513. That is, matching may be performed between the 3D map information about the first area 511 and the 3D map information about at least one of the second areas 513.

Figure 8:
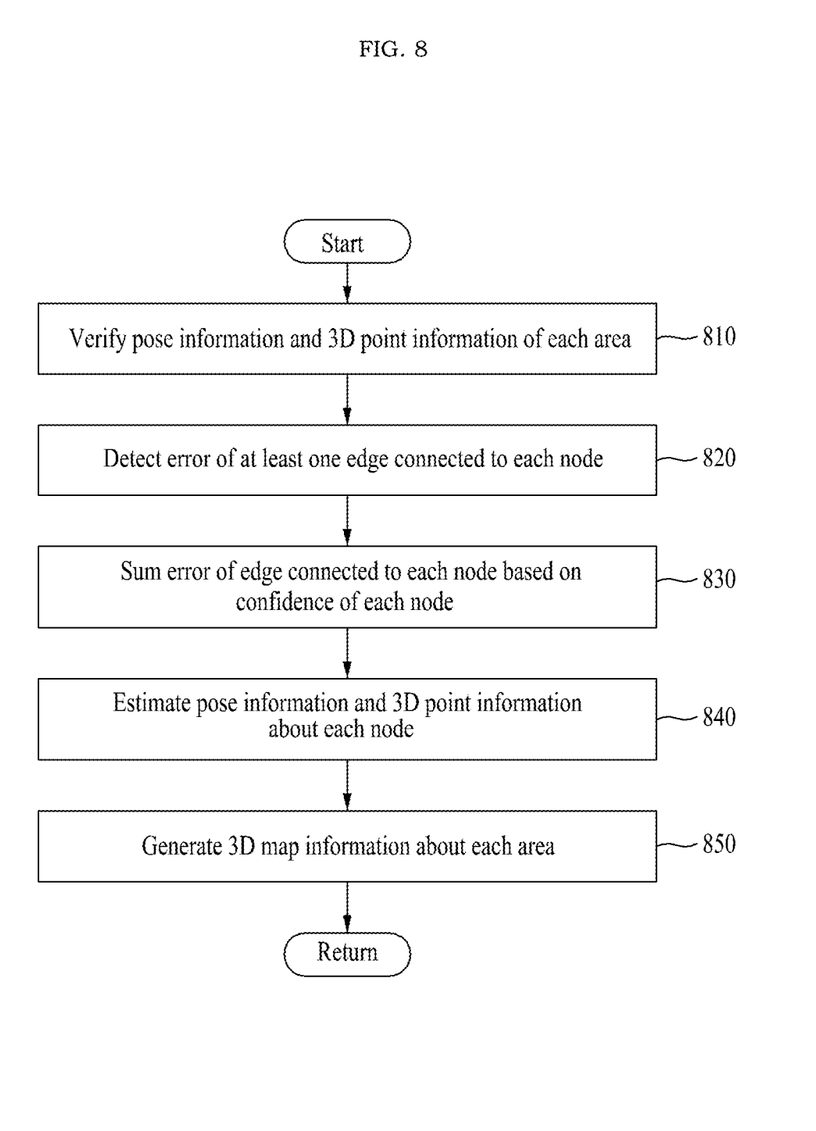
FIG. 8 is a flowchart illustrating an example of a 3D map information generation operation for each area of FIG. 4 according to at least one example embodiment.

FIG. 8 is a flowchart illustrating an example of a 3D map information generation operation 440 for each area 510 of FIG. 4.

Referring to FIG. 8, in operation 810, the electronic device 100 may verify pose information of each area 510. The processor 150 may verify the pose information of each area 510 based on 2D image information about each area 510. Here, the 2D image information may include at least one street view image about each area 510 and pose information about each street view image. Through this, the processor 150 may determine the pose information of each node 520, that is, first pose information in each area 510 from the pose information of each area 510. Here, the first pose information may include a first position and a first pose of each node 520. The processor 150 may detect a feature point about each street view image, may perform feature point matching between at least two street view images, and may acquire correlation therebetween. Also, the processor 150 may generate a 3D point based on pose information of at least two street view images through a triangulation scheme and may acquire first 3D point information based on the 3D point.

In operation 820, the electronic device 100 may detect an error (e) of at least one edge 530 connected to each node 520. Here, the error of each edge 530 may include at least one of a pose error and a projection error. According to at least one example embodiment, the processor 150 may detect the pose error of each edge 530 based on a first pose of each node 520 according to the following Equation 1. According to at least one example embodiment, the processor 150 may detect the projection error of each edge 530 based on the first pose of each node 520 according to the following Equation 3.

$$e(x_i, x_j, [R|t]_i^j) = t2v(x_j^{-1} \times (x_i \times [R|t]_i^j))$$ [Equation 1]

In Equation 1, $x_i$ denotes a pose of each node 520, that is, the first pose, $x_j$ denotes a pose of another node 520 connected to each node 520, $[R|t]_i^j$ denotes a difference between poses of the nodes 520 connected to the edge 530, R denotes a rotation matrix, t denotes a translation vector, and t2v (*) denotes a vectorize function. For example, t2v (*), as a function of transforming a transformation matrix according to R and t to a 1×6 vector, may use a screw displacement scheme defined as the following Equation 2.

$$T = \begin{bmatrix} R & t \\ 0 & 1 \end{bmatrix} = \exp(\hat{\xi}) = \exp\left(\begin{bmatrix} 0 & -w_z & w_y & v_x \\ w_z & 0 & -w_x & v_y \\ -w_y & w_x & 0 & v_z \\ 0 & 0 & 0 & 0 \end{bmatrix}\right)$$ [Equation 2]

$$\xi = [w_x, w_y, w_z, v_x, v_y, v_z]^T$$

In Equation 2, T denotes a translation matrix, $\hat{\xi}$ denotes a twist matrix, $\xi$ denotes a twist vector, $w_*$ denotes a rotation velocity, and $v_*$ denotes a translation velocity.

$$e(x_i, l_j, [R|t]_i) = K_i \times \text{proj}(R_i^{-1} \times l_j - t_i) - p_j$$ [Equation 3]

In Equation 3, $l_j$ denotes a 3D point generated through feature point matching, $K_i$ denotes a camera matrix associated with a pose of each node 520, and $p_j$ denotes a corresponding pixel coordinate when the generated 3D point is two-dimensionally projected.

In operation 830, the electronic device 100 may sum an error of at least one edge 530 connected to each node 520 based on the confidence of each node 520. The processor 150 may sum the error of at least one edge 530 connected to each node 520 according to a graph structure based on a graph error function represented by the following Equation 4. For example, based on the confidence of each node 520, a covariance of the graph error function as represented by the following Equation 4 may be differently set. Here, a covariance set for the boundary node 721 may be less than a covariance set for the non-boundary node 723. Here, the processor 150 may apply a first covariance corresponding to the first confidence to the boundary node 721 and may apply a second covariance corresponding to the second confidence to the non-boundary node 723. That is, the first covariance may be less than the second covariance.

$$f(\cdot) = \Sigma_k e_k^T \Omega_k e_k$$ [Equation 4]

In Equation 4, $f(\cdot)$ denotes the graph error function, e denotes the error of each edge 530, and $\Omega$ denotes the covariance.

In operation 840, the electronic device 100 may estimate pose information and 3D point information about each node 520. As represented by the following Equation 5, the processor 150 may estimate pose information about each node 520, that is, second pose information such that a summation result of errors of the edges 530 may decrease. Here, the second pose information may include a second position and a second pose of each node 520. Also, the processor 150 may determine or optimize a 3D point about each node 520 and may estimate 3D point information about each node 520, that is, second 3D point information such that a summation result of errors of the edges 530 may decrease as represented by the following Equation 5. For example, the processor 150 may recursively estimate the pose information and the 3D point information using a Gauss-Newton scheme.

$$x^*, l^* = \text{argmin}_x \Sigma_k e_k^T e_k^T \Omega_k e_k$$ [Equation 5]

In Equation 5, x*, l* denote pose information about each node 520, x* denotes a pose of each node 520, that is, the second pose, and l* denotes an estimated 3D point.

In operation 850, the electronic device 100 may generate 3D map information about each area 510 based on the pose information and the 3D point information about each node 520. The processor 150 may generate the 3D map information about each area 510 based on the second pose information and the second 3D point information about each node 520. Here, the processor 150 may store the 3D map information about each area 510 in the memory 140.

The electronic device 100 may perform operation 330 by returning to FIG. 3. Referring again to FIG. 3, in operation 330, the electronic device 100 may provide visual localization of a query image in the outdoor environment based on an analysis of the 3D map information. The processor 150 may perform visual localization of a query image based on an analysis of the 3D map information. According to at least one example embodiment, the processor 150 may perform visual localization corresponding to a query image received from the external device 181, 183. The processor 150 may receive the query image from the external device 181, 183 through the communication module 110. The processor 150 may detect 3D map information about one of the areas 510 based on the query image. Here, the processor 150 may extract feature information from the query image through a deep learning model and may detect 3D map information based on the feature information. The processor 150 may determine (e.g., estimate) a position of a point corresponding to the query image in the 3D map information. In other words, the processor 150 may extract feature information from the query image and detect a 3D map information based on the extracted feature information, and perform visual localization corresponding to the query image in the outdoor environment by determining a position of a point corresponding to the query image in the 3D map information.

An operating method of the electronic device 100 according to at least one example embodiment may include acquiring 2D image information about an outdoor environment, generating 3D map information about an outdoor environment based on the 2D image information, and performing visual localization of a query image in the outdoor environment based on an analysis of the 3D map information.

According to at least one example embodiment, the generating of the 3D map information may include segmenting the outdoor environment into a plurality of areas 510, and generating the 3D map information for each of the areas 510.

According to at least one example embodiment, the generating of the 3D map information for each of the areas 510 may include classifying at least one node 520 into the boundary node 721 or the non-boundary node 723 in each of the areas 510, applying a different confidence to each of the boundary node 721 and the non-boundary node 723, and generating the 3D map information based on the node 520.

According to at least one example embodiment, the generating of the 3D map information based on the node 520 may include generating the 3D map information using an SfM algorithm.

According to at least one example embodiment, the generating of the 3D map information based on the node 520 may include generating the 3D map information based on pose information of each node 520.

According to at least one example embodiment, the generating of the 3D map information based on the pose information may include detecting an error of at least one edge 530 connected to the node 520 based on the confidence, estimating the pose information of the node 520 based on the error, estimating 3D point information of the node 520 based on the error, and generating the 3D map information based on the pose information and the 3D point information.

According to at least one example embodiment, the generating of the 3D map information based on the pose information may further include verifying first pose information of the node 520 based on the 2D image information.

According to at least one example embodiment, the detecting of the error of the at least one edge 530 connected to the node 520 based on the confidence may include detecting the error of the at least one edge 530 connected to the node based on the first pose information and summing the error using the confidence.

According to at least one example embodiment, the estimating of the pose information of the node 520 based on the error may include estimating second pose information of which the error decreases.

According to at least one example embodiment, the generating of the 3D map information based on the pose information may include generating the 3D map information based on the second pose information.

According to at least one example embodiment, the 2D image information may include a plurality of street view images about each of the areas 510.

The electronic device 100 according to at least one example embodiment may include the memory 140 and the processor 150 configured to connect to the memory 140 and to execute at least one instruction stored in the memory 140.

According to at least one example embodiment, the processor 150 may be configured to acquire 2D image information about an outdoor environment, generate 3D map information based on the 2D image information, and perform localization in the outdoor environment based on the 3D map information.

According to at least one example embodiment, the processor 150 may be configured to segment the outdoor environment into a plurality of areas 510, and generate the 3D map information for each of the areas 510.

According to at least one example embodiment, the processor 150 may be further configured to classify at least one node 520 into the boundary node 721 or the non-boundary node 723 in each of the areas 510, apply a different confidence to each of the boundary node 721 and the non-boundary node 723, and generate the 3D map information based on the node 520.

According to at least one example embodiment, the processor 150 may be further configured to generate the 3D map information using an SfM algorithm.

According to at least one example embodiment, the processor 150 may be configured to generate the 3D map information based on pose information of the node 520.

According to at least one example embodiment, the processor 150 may be further configured to detect an error of at least one edge 530 connected to the node 520 based on the confidence, t estimate the pose information and 3D point information of the node 520 based on the error, and generate the 3D map information based on the pose information and the 3D point information.

According to at least one example embodiment, the processor 150 may be further configured to verify first pose information of the node 520 based on the 2D image information.

According to at least one example embodiment, the processor 150 may be further configured to detect the error of the at least one edge 530 connected to the node 520 based on the first pose information, and sum the error using the confidence.

According to at least one example embodiment, the processor 150 may be further configured to estimate second pose information of which the error decreases, and generate the 3D map information based on the second pose information.

According to at least one example embodiment, the 2D image information may include a plurality of street view images for each of the areas 510.

Various example embodiments herein may be implemented as a computer program that includes at least one instruction stored in a computer apparatus (e.g., a storage medium readable by the electronic device 100) (e.g., the memory 140). For example, a processor (e.g., the processor 150) of the computer apparatus may call at least one instruction from among the stored one or more instructions from the storage medium and may execute the called at least one instruction, which enables the computer apparatus to operate to perform at least one function according to the called at least one instruction. The at least one instruction may include a code generated by a compiler or a code executable by an interpreter. The computer-readable storage medium may be provided in a form of a non-transitory record medium. Here, "non-transitory" simply indicates that the record medium is a tangible device and does not include a signal (e.g., electromagnetic wave). This term does not distinguish a case in which data is semi-permanently stored and a case in which the data is temporarily stored in the record medium.

A computer program according to at least one example embodiment may be stored in a non-transitory computer-readable record medium to implement a visual localization providing method in conjunction with a computer apparatus.

According to at least one example embodiment, a visual localization providing method may include acquiring 2D image information about an outdoor environment, generating 3D map information based on 2D image information and performing localization in the outdoor environment based on 3D map information.

According to at least one example embodiment, the electronic device 100 may generate 3D map information about an outdoor environment and may provide visual localization in the outdoor environment. That is, the electronic device 100 may perform localization in the outdoor environment based on the 3D map information about the outdoor environment. Here, the electronic device 100 may segment the outdoor environment into a plurality of areas 510 and may generate 3D map information for each of the areas 510, which may lead to reducing a throughput (e.g., an amount of data to be processed) and a processing time used to generate the 3D map information about the outdoor environment. In addition, the electronic device 100 may generate the 3D map information for each of the areas 510 by considering pose information about adjacent areas, which may lead to minimizing distortion in a boundary between the areas 510.

The example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and B," "A, B, or C," "at least one of A, B, or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware, software, or firmware, and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC).

According to some example embodiments, each component (e.g., module or program) of the aforementioned components may include a singular entity or a plurality of entities. According to some example embodiments, at least one component among the aforementioned components or operations may be omitted, or at least one another component or operation may be added. Alternately or additionally, the plurality of components (e.g., module or program) may be integrated into a single component. In this case, the integrated component may perform the same or similar functionality as being performed by a corresponding component among a plurality of components before integrating at least one function of each component of the plurality of components. According to some example embodiments, operations performed by a module, a program, or another component may be performed in parallel, repeatedly, or heuristically, or at least one of the operations may be performed in different order or omitted. Alternatively, at least one another operation may be added.

While this disclosure includes some specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. An operating method of an electronic device, the method comprising:
   acquiring, using a processor included in the electronic device, two-dimensional (2D) image information about an outdoor environment;
   generating, using the processor, three-dimensional (3D) map information about the outdoor environment based on the 2D image information; and
   determining, using the processor, a position of a point in the 3D map information corresponding to a query image.

2. The method of claim 1, wherein the generating 3D map information comprises:
   segmenting the outdoor environment into a plurality of areas; and
   generating the 3D map information for each of the areas.

3. The method of claim 2, wherein the generating the 3D map information for each of the areas comprises:
   classifying at least one node into a boundary node or a non-boundary node in each of the areas;
   applying a confidence to each of the boundary node and the non-boundary node, the confidence applied to the boundary node being different from the confidence applied to the non-boundary node; and
   generating the 3D map information based on the node.

4. The method of claim 3, wherein the generating the 3D map information based on the node comprises generating the 3D map information based on pose information of each node.

5. The method of claim 4, wherein the generating the 3D map information based on the pose information comprises:
   detecting an error of at least one edge connected to the node based on the confidence;
   estimating the pose information of the node based on the error;
   estimating 3D point information of the node based on the error; and
   generating the 3D map information based on the pose information and the 3D point information.

6. The method of claim 5, wherein the generating the 3D map information based on the pose information further comprises verifying first pose information of the node based on the 2D image information.

7. The method of claim 6, wherein the detecting an error of the at least one edge comprises:
    detecting the error of the at least one edge connected to the node based on the first pose information; and
    summing the error using the confidence.

8. The method of claim 7, wherein
    the estimating the pose information of the node based on the error comprises estimating second pose information of which the error decreases, and
    the generating the 3D map information based on the pose information comprises generating the 3D map information based on the second pose information.

9. An electronic device comprising:
    a memory; and
    a processor configured to connect to the memory and to execute at least one instruction stored in the memory, the processor further configured to,
        acquire two-dimensional (2D) image information about an outdoor environment,
        generate three-dimensional (3D) map information about the outdoor environment based on the 2D image information, and
        determine a position of a point in the 3D map information corresponding to a query image.

10. The electronic device of claim 9, wherein the processor is further configured to segment the outdoor environment into a plurality of areas, and to generate the 3D map information for each of the areas.

11. The electronic device of claim 10, wherein the processor is further configured to
    classify at least one node into a boundary node or a non-boundary node in each of the areas,
    apply a confidence to each of the boundary node and the non-boundary node, the confidence applied to the boundary node being different from the confidence applied to the non-boundary node, and
    generate the 3D map information based on the node.

12. The electronic device of claim 11, wherein the processor is further configured to generate the 3D map information using a structure-from-motion (SfM) algorithm.

13. The electronic device of claim 11, wherein the processor is further configured to generate the 3D map information based on pose information of each node.

14. The electronic device of claim 13, wherein the processor is further configured to
    detect an error of at least one edge connected to the node based on the confidence,
    estimate the pose information and 3D point information of the node based on the error, and
    generate the 3D map information based on the pose information and the 3D point information.

15. The electronic device of claim 14, wherein the processor is further configured to
    verify first pose information of the node based on the 2D image information,
    detect the error of the at least one edge connected to the node based on the first pose information,
    sum the error using the confidence,
    estimate second pose information of which the error decreases, and
    generate the 3D map information based on the second pose information.

16. The electronic device of claim 10, wherein the 2D image information comprises a plurality of street view images for each of the areas.

17. A non-transitory computer-readable record medium storing instructions that, when executed by a processor, cause a computer to implement a visual localization providing method, the visual localization providing method comprising:
    acquiring, using the processor, two-dimensional (2D) image information about an outdoor environment;
    generating, using the processor, three-dimensional (3D) map information about the outdoor environment based on the 2D image information; and
    determining, using the processor, a position of a point in the 3D map information corresponding to a query image.

* * * * *